(12) United States Patent
Hong

(10) Patent No.: US 12,732,838 B2
(45) Date of Patent: Sep. 8, 2026

(54) BEAM MEASUREMENT METHOD AND DEVICE, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 475 days.

(21) Appl. No.: 18/033,932

(22) PCT Filed: Oct. 28, 2020

(86) PCT No.: PCT/CN2020/124516
§ 371 (c)(1),
(2) Date: Apr. 26, 2023

(87) PCT Pub. No.: WO2022/087914
PCT Pub. Date: May 5, 2022

(65) Prior Publication Data

US 2023/0308912 A1 Sep. 28, 2023

(51) Int. Cl.
*H04W 24/08* (2009.01)
*H04B 17/318* (2015.01)

(52) U.S. Cl.
CPC .......... *H04W 24/08* (2013.01); *H04B 17/318* (2015.01)

(58) Field of Classification Search
CPC ............. H04W 24/08; H04W 52/0229; H04W 52/0245; H04B 17/318
See application file for complete search history.

(56) References Cited

U.S. PATENT DOCUMENTS

| | | | | |
|---|---|---|---|---|
| 2019/0223043 A1* | 7/2019 | Geng | .................... | H04W 76/27 |
| 2020/0344742 A1* | 10/2020 | Chen | .................... | H04B 7/0695 |
| 2022/0224486 A1* | 7/2022 | Luo | .................. | H04W 52/0229 |

(Continued)

FOREIGN PATENT DOCUMENTS

| | | |
|---|---|---|
| CN | 109314871 A | 2/2019 |
| CN | 109996265 A | 7/2019 |

(Continued)

OTHER PUBLICATIONS

European Patent Application No. 20959077.7, Search Report dated Jun. 21, 2024, 8 pages.

(Continued)

*Primary Examiner* — Charles C Jiang
*Assistant Examiner* — Ryan C Kavleski
(74) *Attorney, Agent, or Firm* — Cozen O'Connor

(57) ABSTRACT

A beam measurement method includes: receiving first information including first beam indication information for indicating a downlink receiving beam; and in response to the downlink receiving beam associated with the first beam indication information being the same as a downlink serving beam used by a terminal device, determining a measurement manner of a reference signal of a beam according to a signal strength of the downlink serving beam. If the downlink receiving beam associated with the first beam indication information is different from the downlink serving beam used by the terminal device, measuring a reference signal of at least one downlink candidate beam corresponding to the terminal device.

20 Claims, 2 Drawing Sheets receiving first information

S11 in response to the downlink receiving beam associated with first beam indication information being the same as a downlink serving beam used by a terminal device, determining a measurement manner of a reference signal of a beam according to a signal strength of the downlink serving beam.

S12

(56) References Cited

U.S. PATENT DOCUMENTS

2022/0337304 A1* 10/2022 Qiao ................. H04W 74/0833
2023/0262551 A1* 8/2023 Joshi ..................... H04W 76/16
370/252

FOREIGN PATENT DOCUMENTS

CN 111278042 A 6/2020
CN 111436072 A 7/2020
WO WO 2018185662 A1 10/2018

OTHER PUBLICATIONS

Indian Patent Application No. 202347035487, Office Action dated Mar. 18, 2024, 7 pages.
PCT/CN2020/124516, English translation of Search Report dated Jul. 30, 2021, 2 pages.

* cited by examiner

BEAM MEASUREMENT METHOD AND DEVICE, AND STORAGE MEDIUM

CROSS-REFERENCE TO RELATED APPLICATIONS

The present application is a National Stage of International Application No. PCT/CN2020/124516, filed on Oct. 28, 2020, the contents of which are incorporated herein by reference in their entireties for all purposes.

FIELD

The present disclosure generally relates to the field of communication technologies, and in particular, to a beam measurement method, a device, and a storage medium.

BACKGROUND

With the ongoing development of communication technologies, more requirements are being placed on the communication system. For example, the communication system not only needs to provide a relatively large system capacity and high data rate, but it also needs to reduce the energy consumption of the terminal device connected to the communication system, both to prolong the battery life of the terminal device and to improve the working performance of the terminal device. For example, in the case that the power consumption of the terminal device in the beam measurement is reduced, the service life of the terminal device can be extended.

However, in the related art of the existing beam measurements, the beam measurement of the terminal device is performed according to protocols, and cannot be initiated or controlled by the terminal device, and thus there is still a need for reducing the power consumption of the terminal device.

SUMMARY

In a first aspect of embodiments of the present disclosure, a beam measurement method is provided. The beam measurement method includes: receiving first information, where the first information comprises first beam indication information for indicating a downlink receiving beam; and in response to the downlink receiving beam associated with the first beam indication information being the same as a downlink serving beam used by a terminal device, determining a measurement manner of a reference signal of a beam according to a signal strength of the downlink serving beam.

In a second aspect of embodiments of the present disclosure, an electronic device is provided. The electronic device includes a memory having stored therein a computer program, and a processor connected to the memory. In the case that the computer program is invoked by the processor, the processor is configured to perform the method described above in the first aspect.

In a third aspect of embodiments of the present disclosure, a non-transitory computer-readable storage medium having stored therein a computer program that, when executed by a processor, causes the processor to implement the method described above in the first aspect.

BRIEF DESCRIPTION OF THE DRAWINGS

In order to illustrate the technical solutions in embodiments of the present disclosure clearly, the accompanying drawings for the embodiments will be briefly introduced below. The drawings in the following description are only related to some embodiments of the present disclosure. For those of ordinary skill in the art, other drawings can also be obtained according to these drawings without any creative effort.

DETAILED DESCRIPTION

Figure 1:
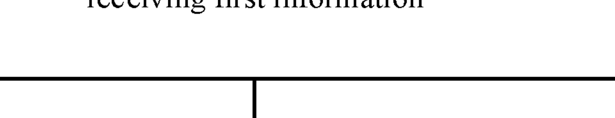
FIG. 1 is a flow chart of a beam measurement method according to an embodiment of the present disclosure.

Technical solutions in the embodiments of the present disclosure will be clearly and completely described below with reference to the accompanying drawings in the embodiments of the present disclosure. The described embodiments are only a part of the embodiments, not all embodiments of the present disclosure. Based on the embodiments in the present disclosure, those of ordinary skill in the art can obtain other embodiments without creative work, and these other embodiments should be considered as within the protection scope of the present disclosure.

The terminal device in the embodiments of the present disclosure may be a device that provides voice and/or data connectivity to a user, a handheld device with a wireless connection function, or other processing devices connected to a wireless modem, as well as a terminal in a future 5G system or a terminal device in a future evolutional public land mobile network (PLMN). The terminal device may be named differently in different systems. For example, in a 5G system, the terminal device may be called a user equipment (UE). It can also be a wireless terminal device that can communicate with one or more core network (CN) devices via a radio access network (RAN). The wireless terminal device can be a mobile terminal device, such as a mobile phone (or called "cellular" phone) and a computer having a mobile terminal device, such as portable, pocket-sized, handheld, computer built-in or vehicle mounted mobile devices, which exchange language and/or data with the radio access network. For example, the terminal device is a virtual reality (VR) device, an augmented reality (AR) device, a wireless terminal in industrial control, a wireless terminal in self-driving, a wireless terminal in remote medical surgery, a wireless terminal in smart grid, a wireless terminal in transportation safety, a wireless terminal in smart city, a wireless terminal in smart home, a personal communication service (PCS) phone, a cordless phone, a session initiated protocol (SIP) phone, a wireless local loop (WLL) station, or a personal digital assistant (PDA), which is not limited in the embodiments of the present disclosure. The wireless terminal device may also be referred to as a system, a subscriber unit, a subscriber station, a mobile station, a mobile, a remote station, an access point, a remote terminal, an access terminal, a user terminal, a user agent, or a user device, which is not limited in the embodiments of the present disclosure.

A network device in the embodiments of the present disclosure may include a plurality of base stations of cells providing services for the terminal device. Depending on various specific applications, the base station may be called an access point, or may be a device in the access network that communicates with the wireless terminal device through one or more sectors on an air interface, or may be called other names. The base station may be a NodeB in a GSM system, a CDMA system, or a WCDMA system, or an evolutional network device (an evolutional Node B, eNB or e-NodeB) in an LTE system, or a 5G base station (gNB) in a 5G network architecture, or a home evolved Node B (HeNB), or a relay node, or a femto base station, or a pico base station, which is not limited in the embodiments of the present disclosure.

FIG. 1 is a flow chart of a beam measurement method according to an embodiment of the present disclosure. As shown in FIG. 1, the beam measurement method provided by the embodiments of the present disclosure includes the following steps.

In block S11, a first message is received.

In some feasible implementations, the first information includes first beam indication information which indicates a downlink receiving beam. The downlink receiving beam is a beam transmitted by a network device and is to be used for communication with a terminal device. For example, the network device may send the downlink receiving beam carrying a physical downlink shared channel (PDSCH) or a physical downlink control channel (PDCCH) for the terminal device to receive.

Optionally, the first beam indication information may include an index of a first transmission configuration indicator (TCI) state associated with the downlink receiving beam.

The network device configures the TCI state for the terminal device through radio resource control (RRC) signaling, and configures a quasi-co-location (QCL) relationship between the beam sent by the network device and a reference signal (RS). When a transmission configuration indicator (TCI) is used for the QCL indication of the PDCCH, the network device uses the RRC signaling or the RRC and the control element (CE) of a medium access control (MAC) to notify the terminal device of a TCI state, that is, a RS set is indicated by the index of the TCI state, and the RS set has a QCL relationship with the PDCCH, so that the terminal device can know, according to the index of the TCI state, which downlink receiving beam (i.e., Rx beam) can be used to receive the PDCCH.

On this basis, the network device may indicate the downlink receiving beam according to the first beam indication information including the index of the first TCI state associated with the downlink receiving beam.

Optionally, the first beam indication information may include a beam identifier of a downlink receiving beam. In other words, the first beam indication information may include the TCI state index or the beam identifier, and the downlink receiving beam is indicated by the TCI state index or the beam identifier.

The network device may send the first information based on the DCI 1_1 signaling, for example, send the first information including the first beam indication information of the first TCI state index associated with the downlink receiving beam based on the DCI 1_1 signaling.

In an optional embodiment, the network device may send the first information to the terminal device through system signaling, high-level signaling or physical layer signaling.

In block S12, in response to a downlink receiving beam associated with the first beam indication information being the same as a downlink serving beam used by a terminal device, a measurement manner of a reference signal of a beam is determined according to a signal strength of the downlink serving beam.

It should be noted that the above measurement manner can be understood as a measurement mode of the reference signal of the beam. In the embodiments of the present disclosure, the determination of the measurement manner of the reference signal of the beam can also be described as determining whether to measure the reference signal of the beam, or determining whether the terminal device enters a power saving mode (or any specified mode). The above-mentioned determination of the measurement manner of the reference signal of the beam according to the signal strength of the downlink serving beam may include determining not to measure the reference signal of the beam, or determining to measure the reference signal in the specified mode. Based on the measurement manner in the embodiments of the present disclosure, in response to the downlink receiving beam associated with the first beam indication information being the same as the downlink serving beam used by the terminal device, the terminal device may not measure the reference signal of the beam, measure the reference signal of only a part of beams, or measure the reference signal of all beams under certain circumstances according to the signal strength of the downlink serving beam.

In some feasible implementations, in response to the first beam indication information being the same as second beam indication information associated with the downlink serving beam used by the terminal device, that is, the first beam indication information being the same as the second beam indication information, and accordingly the downlink receiving beam associated with the first beam indication information being the same as the downlink serving beam used by the terminal device, the terminal device determines the measurement manner of the reference signal of the beam according to the signal strength of the downlink serving beam. The second beam indication information includes an index of a second TCI state associated with the downlink serving beam.

In an optional embodiment, in response to the index of the first TCI state associated with the downlink receiving beam included in the first beam indication information being the same as the index of the second TCI state associated with the downlink serving beam included in the second beam indication information, the terminal device determines the measurement manner of the reference signal of the beam according to the signal strength of the downlink serving beam. In other words, when the index of the first TCI state is the same as the index of the second TCI state, the downlink receiving beam associated with the first beam indication information is the same as the downlink serving beam used by the terminal device.

Optionally, the first beam indication information includes the beam identifier of the downlink receiving beam, and in response to the beam identifier of the downlink receiving beam associated with the first beam indication information being the same as a beam identifier of the downlink serving beam used by the terminal device, that is, the beam identifier of the downlink receiving beam being the same as the beam identifier of the downlink serving beam, and accordingly the downlink receiving beam associated with the first beam indication information being the same as the downlink serving beam used by the terminal device, the measurement manner of the reference signal of the beam is determined according to the signal strength of the downlink serving beam.

Optionally, in response to the beam identifier of the downlink receiving beam associated with the first beam indication information being the same as the beam identifier of the downlink serving beam used by the terminal device, the terminal device determines the measurement manner of the reference signal of the beam according to the signal strength of the downlink serving beam.

In an optional embodiment, the terminal device may determine the beam identifier of the downlink receiving beam associated with the first beam indication information according to the index of the first TCI state associated with the downlink receiving beam included in the first beam indication information. In response to the beam identifier of the downlink receiving beam associated with the first beam indication information being the same as the beam identifier of the downlink serving beam used by the terminal device, the measurement manner of the reference signal of the beam is determined according to the signal strength of the downlink serving beam.

In an optional embodiment, the terminal device may determine the beam identifier of the downlink serving beam according to the index of the second TCI state corresponding to the downlink serving beam used by the terminal device.

For example, based on the index of the first TCI state associated with the downlink receiving beam included in the first beam indication information, the terminal device determines the beam identifier of the downlink receiving beam as beam #1. If the current beam identifier of the downlink serving beam of the terminal device is beam #1, it means that the beam identifier of the downlink serving beam is the same as the beam identifier of the downlink receiving beam corresponding to the first beam indication information, and the terminal device can determine the measurement manner of the reference signal of the beam according to the signal strength of the downlink serving beam. The beam identifier in the embodiments of the present disclosure includes, but is not limited to, a number and a character, such as beam #1.

In some feasible implementations, the beam measurement method provided by the embodiments of the present disclosure further includes: in response to the downlink receiving beam associated with the first beam indication information being different from the downlink serving beam used by the terminal device, measuring a reference signal of at least one downlink candidate beam corresponding to the terminal device.

In some feasible implementations, in response to the first beam indication information being different from the second beam indication information associated with the downlink serving beam used by the terminal equipment, that is, in response to the downlink receiving beam associated with the first beam indication information being different from the downlink serving beam used by the terminal device, the terminal device determines the measurement manner of the reference signal of the beam according to the signal strength of the downlink serving beam. The second beam indication information includes the index of the second TCI state associated with the downlink serving beam.

In an optional embodiment, in response to the index of the first TCI state associated with the downlink receiving beam included in the first beam indication information being different from the index of the second TCI state associated with the downlink serving beam included in the second beam indication information, the terminal device measures the reference signal of at least one downlink candidate beam corresponding to the terminal device.

Optionally, the first beam indication information includes the beam identifier of the downlink receiving beam, and in response to the beam identifier of the downlink receiving beam associated with the first beam indication information being different from the beam identifier of the downlink serving beam used by the terminal device, that is, in response to the downlink receiving beam associated with the first beam indication information being different from the downlink serving beam used by the terminal device, the terminal device measures the reference signal of at least one downlink candidate beam corresponding to the terminal device.

Optionally, in response to the beam identifier of the downlink receiving beam associated with the first beam indication information being different from the beam identifier of the downlink serving beam used by the terminal device, the terminal device measures the reference signal of at least one downlink candidate beam corresponding to the terminal device.

In an optional embodiment, the terminal device determines the beam identifier of the downlink receiving beam associated with the first beam indication information according to the index of the first TCI state associated with the downlink receiving beam included in the first beam indication information. In response to the beam identifier of the downlink receiving beam associated with the first beam indication information being different from the beam identifier of the downlink serving beam used by the terminal device, the terminal device measures the reference signal of at least one downlink candidate beam corresponding to the terminal device.

In an optional embodiment, the terminal device may determine the beam identifier of the downlink serving beam according to the index of the second TCI state corresponding to the downlink serving beam used by the terminal device.

For example, based on the index of the first TCI state associated with the downlink receiving beam included in the first beam indication information, the terminal device determines that the beam identifier of the downlink receiving beam is beam #1. The terminal device determines that the beam identifier of the downlink serving beam is beam #2 according to the index of the second TCI state associated with the downlink serving beam. In response to the beam identifier of the downlink receiving beam being different from the beam identifier of the downlink serving beam, the terminal device measures the reference signal of at least one downlink candidate beam corresponding to the terminal device.

The downlink serving beam of the terminal device is a beam currently used by the terminal device to receive communication transmission from the network device, and the terminal device can receive the indication information associated with the downlink receiving beam from the network device through the downlink serving beam.

The reference signal of the downlink candidate beam includes a channel state information reference signal (CSI-RS) and/or a synchronization signal block (SSB) signal.

Further, the downlink candidate beam corresponding to the terminal device may be a beam sent by the network device detected by the terminal device, or may be a beam indicated, via measurement configuration information, by the network device to the terminal device that the terminal device needs to perform beam measurement. It may be determined according to the actual application scenarios and is not limited herein.

Optionally, when the terminal device measures the reference signal of the at least one downlink candidate beam corresponding to the terminal device, a signal strength of the reference signal of the at least one downlink candidate beam corresponding to the terminal device is measured, according to a protocol, such as Rel-15 protocol, for subsequent possible beam switching. Alternatively, the terminal device may measure the signal strength of the reference signal according to the measurement configuration information sent by the network device. The measurement configuration information includes, but is not limited to, downlink candidate beams to be measured by the terminal device and the number thereof, and a specific reference signal (such as SSB signal) to be measured by the terminal device.

In some feasible implementations, the determination of the measurement manner of the reference signal of the beam according to the signal strength of the downlink serving beam performed by the terminal device includes at least one of the following: in response to the signal strength of the downlink serving beam being greater than or equal to a first threshold, determining not to measure the reference signal of the beam; in response to the signal strength of the downlink serving beam being greater than or equal to a second threshold, measuring the reference signal of the beam in a first mode, where the first threshold is greater than the second threshold; determining a difference between the signal strength of the downlink serving beam and a signal strength of each downlink candidate beam corresponding to the terminal device, and in response to every difference (that is, all differences corresponding to all downlink candidate beams) being greater than or equal to a third threshold, determining not to measure the reference signal of the beam; in response to every difference being greater than or equal to a fourth threshold, measuring the reference signal of the beam in the first mode, where the third threshold is greater than the fourth threshold; in response to the signal strength of the downlink serving beam being less than the second threshold, measuring the reference signal of each downlink candidate beam; and in response to any difference being less than the fourth threshold, measuring the reference signal of each downlink candidate beam.

The first threshold is an upper limit corresponding to the signal strength of the reference signal, the second threshold is a lower limit corresponding to the signal strength of the reference signal, and the first threshold is greater than the second threshold. The third threshold is an upper limit corresponding to the difference between the signal strength of the downlink serving beam and the signal strength of each downlink candidate beam, the fourth threshold is a lower limit corresponding to the difference between the signal strength of the downlink serving beam and the signal strength of each downlink candidate beam, and the third threshold value is greater than the fourth threshold value.

A specific implementation of the terminal device determining the measurement manner of the reference signal of the beam according to the signal strength of the downlink serving beam may be determined in one of the above manners or a combination thereof, which is not limited herein.

In an embodiment, the downlink candidate beam corresponds to a plurality of reference signals, such as the CSI-RS and the SSB signal, and the signal strengths of the CSI-RS and the SSB signal correspond to different first and second thresholds. In this case, the terminal device determines not to measure the reference signal of the beam in response to the signal strength of the SSB signal being greater than or equal to the respective first threshold for the SSB signal and the signal strength of the CSI-RS being greater than or equal to the respective first threshold for the CSI-RS. Optionally, the terminal device measures the reference signal of the beam in the first mode in response to the signal strength of the SSB signal being greater than or equal to the respective second threshold for the SSB signal and the signal strength of the CSI-RS being greater than or equal to the respective second threshold SSB signal for the CSI-RS. Optionally, in the case that the signal strength of any reference signal of the SSB signal and the CSI-RS is less than its corresponding second threshold, the terminal device measures the reference signal of the at least one downlink candidate beam (may be one, multiple or all downlink candidate beams) in response to the downlink receiving beam being different from the downlink serving beam. The terminal device may receive second information sent by the network device, where the second information includes at least one of a first threshold, a second threshold, a third threshold, and a fourth threshold.

Optionally, in response to a difference less than the fourth threshold, a reference signal of a candidate beam having a signal strength of greater than a sixth threshold is measured, that is, the reference signal of the downlink candidate beam having a relatively high signal strength is measured.

Optionally, in response to a difference less than the fourth threshold, a reference signal of a downlink candidate beam corresponding to a difference less than a seventh threshold is measured, that is, a reference signal of a downlink candidate beam which has a similar signal strength to the signal strength of the downlink serving beam is measured.

The sixth threshold and the seventh threshold mentioned above may be specifically determined according to requirements of actual applications, which are not limited herein.

In some feasible implementations, in response to the downlink receiving beam associated with the first beam indication information being the same as the downlink serving beam used by the terminal device, the terminal device determines a working mode of the terminal device according to the signal strength of the downlink serving beam, that is, whether the terminal device enters the power saving mode or the power saving state.

In an optional embodiment, in response to the signal strength of the downlink serving beam being greater than or equal to the first threshold, the terminal device enters the first mode (such as the above-mentioned power saving mode), and in the first mode, it is determined that the terminal device does not measure the beam transmission of the reference signal in order to realizing the object of reducing the power consumption of the device. In other words, the terminal device determines not to measure the reference signal of the beam, indicating that the working mode of the terminal device is the power saving mode.

Optionally, in response to the signal strength of the downlink serving beam being greater than or equal to the second threshold, the terminal device enters the first mode, and measures the reference signal of the beam in the first mode, to measure the reference signal of the beam while achieving the purpose of reducing the power consumption of the device. In other words, when the terminal device measures the reference signal of the beam in the first mode, it indicates that the working mode of the terminal device is the power saving mode.

Optionally, in a case that the signal strength of the downlink serving beam is less than the second threshold, in response to the downlink receiving beam being different from the downlink serving beam, the terminal device measures the reference signal of at least one downlink candidate beam corresponding to the terminal device. In this case, the working mode of the terminal device is a normal working mode, that is, the terminal device does not enter the power saving mode.

In an optional embodiment, the second information sent by the network device only includes the first threshold, and the terminal device enters the first mode, i.e., determines not to measure the reference signal of the beam, in response to the signal strength of the downlink serving beam being greater than or equal to the first threshold. Alternatively, the signal strength of the downlink serving beam is less than the first threshold, the terminal device measures the reference signal of at least one downlink candidate beam corresponding to the terminal device in response to the downlink receiving beam being different from the downlink serving beam.

In an optional embodiment, the second information sent by the network device only includes the second threshold, and in response to the signal strength of the downlink serving beam being greater than or equal to the second threshold, the terminal device enters the first mode, i.e., measures the reference signal of the beam in the first mode. Alternatively, the signal strength of the downlink serving beam is less than the second threshold, the terminal device measures the reference signal of at least one downlink candidate beam corresponding to the terminal device in response to the downlink receiving beam being different from the downlink serving beam.

In an optional embodiment, the terminal device may determine a difference between the signal strength of the downlink serving beam and a signal strength of each downlink candidate beam, that is, the difference in the signal strength between the downlink serving beam and each of other downlink candidate beams except the downlink serving beam. Further, in response to every difference (that is, all the differences) being greater than or equal to the third threshold, the terminal device enters the first mode, and in the first mode, the terminal device determines not to measure the reference signal of the beam to achieve the purpose of reducing the power consumption of the device. In other words, the terminal device determines not to measure the reference signal of the beam, it indicates that the working mode of the terminal device is the power saving mode.

Optionally, in response to each difference being greater than or equal to the fourth threshold, the terminal device enters the first mode, and measures the reference signal of the beam in the first mode, to measure the reference signal of the beam while achieving the purpose of reducing the power consumption of the device. In other words, the terminal device measures the reference signal of the beam in the first mode, it indicates that the working mode of the terminal device is the power saving mode.

Optionally, in a case where any difference is less than the fourth threshold, the terminal device measures the reference signal of at least one downlink candidate beam corresponding to the terminal device in response to the downlink receiving beam being different from the downlink serving beam. In this case, the working mode of the terminal device is the normal working mode, that is, the terminal device does not enter the power saving mode.

In an optional embodiment, the second information sent by the network device only includes the third threshold, in response to each difference being greater than or equal to the third threshold, the terminal device enters the first mode, and determines not to measure the reference signal of the beam. Otherwise, the terminal device may measure the reference signal of at least one downlink candidate beam corresponding to the terminal device in response to the downlink receiving beam being different from the downlink serving beam. In an optional embodiment, the second information sent by the network device only includes the fourth threshold, in response to each difference being greater than or equal to the fourth threshold, the terminal device enters the first mode, and measures the reference signal of the beam in the first mode. Otherwise, the terminal device measures the reference signal of at least one downlink candidate beam corresponding to the terminal device in response to the downlink receiving beam being different from the downlink serving beam.

In some feasible implementations, the measurement of the reference signal of the beam in the first mode includes at least one of the following: measuring the reference signal of each downlink candidate beam according to a first time interval, where the first time interval is greater than or equal to a second time interval; determining the signal strength of each downlink candidate beam, and measuring the reference signal of the downlink candidate beam having a signal strength of greater than or equal to a fifth threshold; measuring the reference signal corresponding to the downlink candidate beam.

In an optional embodiment, after entering the first mode, the terminal device may measure the reference signal of each downlink candidate beam according to the first time interval, or measure the reference signal of at least one downlink candidate beam corresponding to the terminal device. The first time interval is greater than or equal to the second time interval, and the second time interval is a time interval used in a case that the terminal device measures the reference signal of each downlink candidate beam based on a protocol agreement. For example, the second time interval is T, the first time interval is mT, where m is a positive integer greater than or equal to 1. That is, after entering the first mode, the terminal device can extend the time interval for measuring the reference signal of each downlink candidate beam (for example, from a time interval of 10 ms to a time interval of 20 ms) to reduce the number of measurements and saving power.

In an optional embodiment, after the terminal device enters the first mode, the terminal device may determine signal strengths of all downlink candidate beams corresponding to the terminal device (including the signal strength of the downlink serving beam), and measure a reference signal of a downlink candidate beam having a signal strength of greater than or equal to a fifth threshold, so as to reduce the number of downlink candidate beams to be measured and achieve the purpose of reducing the power consumption. The fifth threshold is a third limit corresponding to the signal strength of the reference signal. For example, the fifth threshold may be the lower limit corresponding to the signal strength of the reference signal, or any limit between the upper limit and the lower threshold corresponding to the signal strength of the reference signal, which is not limited herein.

In an optional embodiment, the downlink candidate signal corresponds to a plurality of reference signals, such as the CSI-RS and the SSB signal, the terminal device can measure one kind of reference signal corresponding to the downlink candidate beam(s), thereby reducing the power consumption. For example, the SSB signal of each downlink candidate beam is measured.

In the embodiments of the present disclosure, the measurement of the reference signal of each downlink candidate signal performed by the terminal device is to measure a signal strength of the reference signal of each downlink candidate beam.

It should be particularly noted that the above-mentioned implementations of the terminal device to measure the reference signal of the beam in the first mode are only examples, and other measurement manners can be obtained by any combination of the above-mentioned manners, which is not limited herein. For example, the terminal device determines the signal strength of each downlink candidate beam, and measures the reference signal of the downlink candidate beam whose signal strength is greater than or equal to the fifth threshold according to the first time interval. Optionally, the terminal device determines one kind of reference signal corresponding to the downlink candidate beam(s) and performs the measurement at the first time interval.

In the embodiments of the present disclosure, the terminal device may decide which beam measurement to be performed or whether to enter the power saving mode according to the signal strength of the downlink serving beam under the condition that the downlink receiving beam associated with the first beam indication information is the same as the downlink serving beam used by the terminal device. Meanwhile, when the downlink receiving beam associated with the first beam indication information is different from the downlink serving beam used by the terminal device, the terminal device measures the reference signal of at least one downlink candidate beam corresponding to the terminal device, thus achieving a high applicability.

Figure 2:
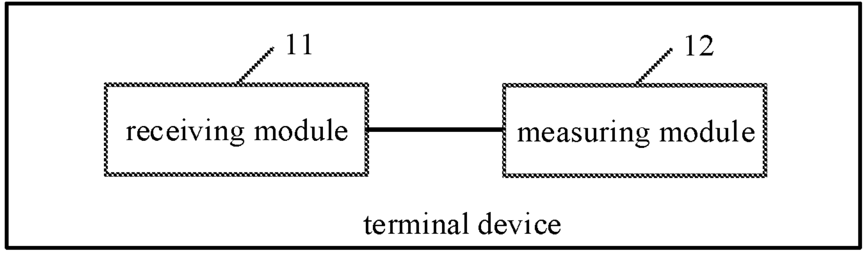
FIG. 2 is a block diagram of a terminal device according to an embodiment of the present disclosure.

FIG. 2 is a block diagram of a terminal device provided by an embodiment of the present disclosure. The terminal device provided by the embodiment of the present disclosure includes: a receiving module 11 and a measuring module 12. The receiving module 11 is configured to receive first information including first beam indication information for indicating a downlink receiving beam. The measuring module 12 is configured to, in response to the downlink receiving beam associated with the first beam indication information being the same as the downlink serving beam used by the terminal device, determine a measurement manner of a reference signal of a beam according to a signal strength of the downlink serving beam.

In some feasible implementations, the measuring module 12 is configured to, in response to the downlink receiving beam associated with the first beam indication information being different from the downlink serving beam used by the terminal device, measure a reference signal of at least one downlink candidate beam corresponding to the terminal device.

In some feasible implementations, the first beam indication information includes an index of a first transmission configuration indicator (TCI) state associated with the downlink receiving beam.

In some feasible implementations, the measuring module 12 is configured to, in response to the first beam indication information being the same as second beam indication information associated with the downlink serving beam used by the terminal device, determine the measurement manner of the reference signal of the beam according to the signal strength of the downlink serving beam, in which the second beam indication information comprises an index of a second TCI state associated with the downlink serving beam; and in response to a beam identifier of the downlink receiving beam associated with the first beam indication information being the same as a beam identifier of the downlink serving beam used by the terminal device, determine the measurement manner of the reference signal of the beam according to the signal strength of the downlink serving beam.

In some feasible implementations, the first beam indication information includes a beam identifier of the downlink receiving beam; and the measuring module 12 is configured to, in response to the beam identifier of the downlink receiving beam being the same as a beam identifier of the downlink serving beam used by the terminal device, determine the measurement manner of the reference signal of the beam according to the signal strength of the downlink serving beam.

In some feasible implementations, the measuring module 12 is configured to perform at least one of the following: in response to the signal strength of the downlink serving beam being greater than or equal to a first threshold, determine not to measure the reference signal of the beam; in response to the signal strength of the downlink serving beam being greater than or equal to a second threshold, measure the reference signal of the beam in a first mode, wherein the first threshold is greater than the second threshold; determine a difference between the signal strength of the downlink serving beam and a signal strength of each downlink candidate beam corresponding to the terminal device, and in response to every difference being greater than or equal to a third threshold, determine not to measure the reference signal of the beam; in response to every difference being greater than or equal to a fourth threshold, measure the reference signal of the beam in the first mode, wherein the third threshold is greater than the fourth threshold; in response to the signal strength of the downlink serving beam being less than the second threshold, measure the reference signal of each downlink candidate beam; and in response to at least one difference being less than the fourth threshold, measure the reference signal of each downlink candidate beam.

In some feasible implementations, the measuring module 12 is configured to, measure the reference signal of each downlink candidate beam according to a first time interval, where the first time interval is greater than or equal to a second time interval in which the second time interval is a time interval applied in a case that the terminal device measures the reference signal of each downlink candidate beam based on a protocol agreement; determine the signal strength of each downlink candidate beam, and measure a reference signal of a downlink candidate beam having a signal strength of greater than or equal to a fifth threshold; and measure one kind of reference signal corresponding to the downlink candidate beam.

In some feasible implementations, the receiving module 11 is configured to receive second information, where the second information includes at least one of the first threshold, the second threshold, the third threshold, or the fourth threshold.

In some feasible implementations, the measuring module 12 is configured to, in response to the downlink receiving beam associated with the first beam indication information being the same as the downlink serving beam used by the terminal device, determine a working mode of the terminal device according to the signal strength of the downlink serving beam.

In some feasible implementations, the measuring module 12 is configured to perform at least one of the following: in response to the signal strength of the downlink serving beam being greater than or equal to a first threshold, the terminal device entering a first mode; in response to the signal strength of the downlink serving beam being greater than or equal to a second threshold, the terminal device entering the first mode; determining a difference between the signal strength of the downlink serving beam and a signal strength of each downlink candidate beam corresponding to the terminal device, and in response to every difference being greater than or equal to a third threshold, the terminal device entering the first mode, wherein the third threshold is greater than the fourth threshold; and in response to every difference being greater than or equal to the fourth threshold, the terminal device entering the first mode.

In some feasible implementations, the reference signal corresponding to the downlink candidate beam comprises a channel state information reference signal (CSI-RS) and/or a synchronization signal block (SSB) signal.

In some feasible implementations, the receiving module 11 is configured to receive a DCI 1_1 signaling, in which the first information is carried in the DCI 1_1 signaling.

In the specific implementations, the terminal device can perform the implementations of every steps shown in FIG. 1 by the built-in functional modules. Details can be referred to the implementations provided by the steps, which will not be elaborated.

Figure 3:
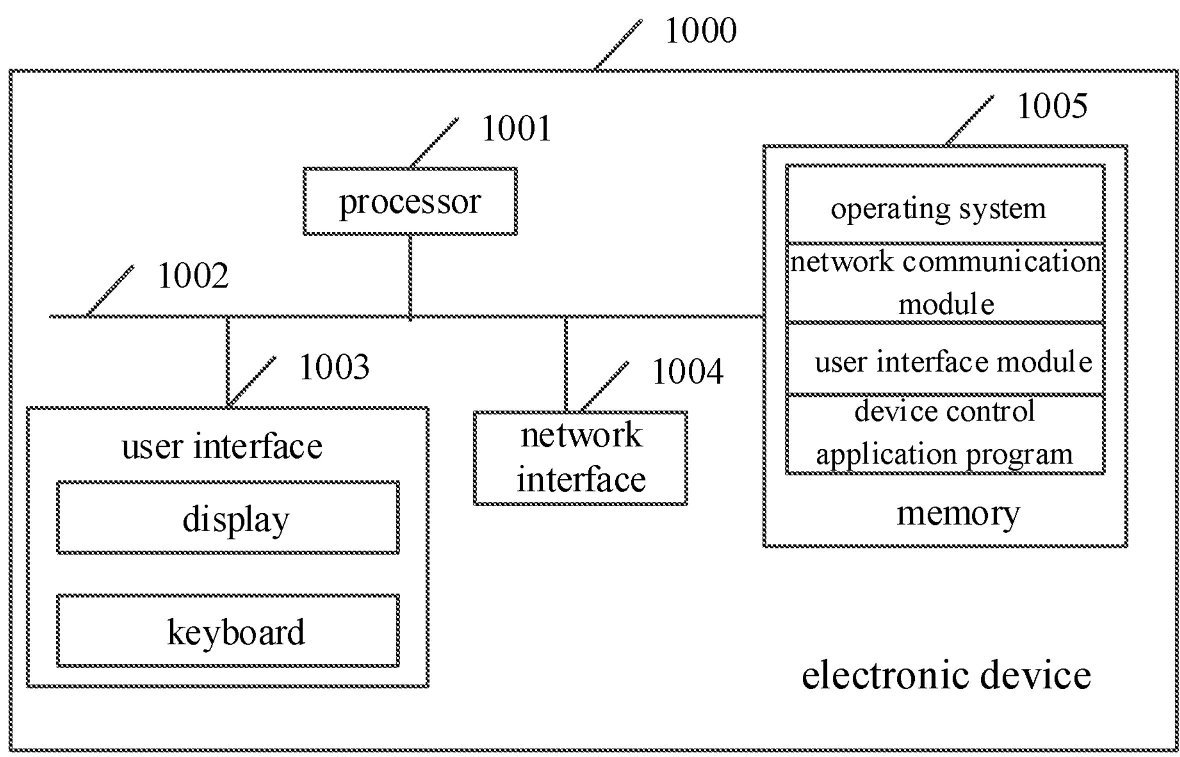
FIG. 3 is a block diagram of an electronic device according to an embodiment of the present disclosure.

FIG. 3 is a block diagram of an electronic device provided by an embodiment of the present disclosure. As shown in FIG. 3, the electronic device 1000 in the embodiment may include: a processor 1001, a network interface 1004 and a memory 1005. In addition, the above-mentioned electronic device 1000 may further include: a user interface 1003, and at least one communication bus 1002. The communication bus 1002 is configured to realize the connection and communication among these components. The user interface 1003 may include a display and a keyboard. Optionally, the user interface 1003 may include standard wired and wireless interfaces. Optionally, the network interface 1004 may include standard wired and wireless interfaces (e.g., a WI-FI interface). Optionally, the memory 1005 may be high-speed RAM memory or non-volatile memory, such as at least one disk memory. Optionally, the memory 1005 may be at least one storage device located away from the aforementioned processor 1001. As shown in FIG. 3, the memory 1005 as a computer-readable storage medium may include an operating system, a network communication module, a user interface module, and a device control application program.

In the electronic device 1000 shown in FIG. 3, the network interface 1004 can provide a network communication function, the user interface 1003 is configured to provide an input interface for the user, and the processor 1001 can be used to call the device control application program stored in the memory 1005 to realize any specific implementation of the above embodiments.

It should be understood that, in some feasible implementations, the above-mentioned processor 1001 may be a central processing unit (CPU), or may be other general-purpose processors, a digital signal processor (DSP), an application specific integrated circuit (ASIC), a field-programmable gate array (FPGA), or other programmable logic devices, a discrete gate or transistor logic device, or a discrete hardware component. A general-purpose processor may be a microprocessor, or the processor may be any conventional processor. The memory, which may include a read-only memory and a random access memory, provides instructions and data to the processor. A portion of the memory may include a non-volatile random access memory. For example, the memory may store device type information.

Embodiments of the present disclosure further provide a computer-readable storage medium having stored therein a computer program that, when executed by a processor, causes the processor to implement the steps of the method shown in FIG. 1. Details can be referred to the implementations for each steps, which are not elaborated here.

The above-mentioned computer-readable storage medium may be an internal storage unit of the aforementioned terminal device or the electronic device, such as a hard disk or a memory of the electronic device. The computer-readable storage medium may be an external storage device of the electronic device, such as a plug-in hard disk, a smart media card (SMC), a secure digital (SD) card and a flash card equipped on the electronic device. The above-mentioned computer-readable storage medium may also include a magnetic disk, an optical disk, a read-only memory (ROM) or a random access memory (RAM), and the like. Further, the computer-readable storage medium may include both the internal storage unit of the electronic device and the external storage device. The computer-readable storage medium is configured to store the computer program and other programs and data required by the electronic device. The computer-readable storage medium can further be configured to temporarily store data that has been output or will be output.

Terms "first", "second" and the like in the claims, the description and the drawings of the present disclosure are used to distinguish different objects, rather than to describe a specific order. Furthermore, the terms "comprise" and "include" and any variations thereof are intended to cover non-exclusive inclusion. For example, a process, method, system, product or electronic device comprising a series of steps or units is not limited to the listed steps or units, but optionally also includes unlisted steps or units, or optionally also include other steps or units inherent to the process, method, product or electronic device. In the description, an "embodiment" means that a particular feature, structure, or characteristic described in the embodiment can be included in at least one embodiment of the present disclosure. The appearance of this term in various places in the description is not necessarily all referring to the same embodiment, nor is it a separate or alternative embodiment that is mutually exclusive with other embodiments. It is explicitly and implicitly understood by those skilled in the art that the embodiments described herein may be combined with other embodiments. As used in the description and the appended claims, the term "and/or" refers to one or more of the associated listed items or any combination thereof.

Those of ordinary skill in the art can realize that the units and algorithm steps of each example described in the embodiments disclosed herein can be implemented in electronic hardware, computer software, or a combination of both. In order to clearly illustrate an interchangeability between the hardware and the software, the above description has generally described the components and steps of each example in terms of function. Those skilled may implement the described functionality by using different methods for each particular application, but such implementations should not be considered beyond the scope of the present disclosure.

The embodiments described above are only exemplary embodiments of the present disclosure, and shall not be constructed to limit the scope of the claims of the present disclosure. Therefore, equivalents and changes made according to the claims of the present disclosure are still within the scope of the present disclosure.

What is claimed is:

1. A beam measurement method, comprising:

receiving first information, wherein the first information comprises first beam indication information for indicating a downlink receiving beam; and in response to the downlink receiving beam associated with the first beam indication information being the same as a downlink serving beam used by a terminal device, determining a measurement manner of a reference signal of a beam according to a signal strength of the downlink serving beam;

wherein determining the measurement manner of the reference signal of the beam according to the signal strength of the downlink serving beam comprises:

in response to the signal strength of the downlink serving beam being greater than or equal to a second threshold, measuring the reference signal of the beam in a first mode, wherein the second threshold is a lower limit corresponding to a signal strength of the reference signal, wherein measuring the reference signal of the beam in the first mode comprises:

measuring a reference signal of each downlink candidate beam according to a first time interval, wherein the first time interval is greater than a second time interval, and the second time interval is a time interval used in a case that a terminal device measures the reference signal of each downlink candidate beam based on a protocol agreement.

2. The method according to claim 1, further comprising:

in response to the downlink receiving beam associated with the first beam indication information being different from the downlink serving beam used by the terminal device, measuring a reference signal of at least one downlink candidate beam corresponding to the terminal device.

3. The method according to claim 1, wherein the first beam indication information comprises an index of a first transmission configuration indicator (TCI) state associated with the downlink receiving beam.

4. The method according to claim 3, wherein in response to the downlink receiving beam associated with the first beam indication information being the same as the downlink serving beam used by the terminal device, determining the measurement manner of the reference signal of the beam according to the signal strength of the downlink serving beam comprises any of the following:

in response to the first beam indication information being the same as second beam indication information associated with the downlink serving beam used by the terminal device, determining the measurement manner of the reference signal of the beam according to the signal strength of the downlink serving beam, wherein the second beam indication information comprises an index of a second TCI state associated with the downlink serving beam; and in response to a beam identifier of the downlink receiving beam associated with the first beam indication information being the same as a beam identifier of the downlink serving beam used by the terminal device, determining the measurement manner of the reference signal of the beam according to the signal strength of the downlink serving beam.

5. The method according to claim 1, wherein the first beam indication information comprises a beam identifier of the downlink receiving beam; and in response to the downlink receiving beam associated with the first beam indication information being the same as the downlink serving beam used by the terminal device, determining the measurement manner of the reference signal of the beam according to the signal strength of the downlink serving beam comprises:

in response to the beam identifier of the downlink receiving beam being the same as a beam identifier of the downlink serving beam used by the terminal device, determining the measurement manner of the reference signal of the beam according to the signal strength of the downlink serving beam.

6. The method according to claim 1, wherein determining the measurement manner of the reference signal of the beam according to the signal strength of the downlink serving beam further comprises at least one of the following:

in response to the signal strength of the downlink serving beam being greater than or equal to a first threshold, determining not to measure the reference signal of the beam;

determining a difference between the signal strength of the downlink serving beam and a signal strength of each downlink candidate beam corresponding to the terminal device, and in response to every difference being greater than or equal to a third threshold, determining not to measure the reference signal of the beam;

in response to every difference being greater than or equal to a fourth threshold, measuring the reference signal of the beam in the first mode, wherein the third threshold is greater than the fourth threshold;

in response to the signal strength of the downlink serving beam being less than the second threshold, measuring the reference signal of each downlink candidate beam; and in response to at least one difference being less than the fourth threshold, measuring the reference signal of each downlink candidate beam.

7. The method according to claim 6, wherein measuring the reference signal of the beam in the first mode further comprises at least one of the following:

determining the signal strength of each downlink candidate beam, and measuring a reference signal of a downlink candidate beam having a signal strength of greater than or equal to a fifth threshold; and measuring one kind of reference signal corresponding to the downlink candidate beam.

8. The method according to claim 6, further comprising:

receiving second information, wherein the second information includes at least one of the first threshold, the second threshold, the third threshold, or the fourth threshold.

9. The method according to claim 1, further comprising:

in response to the downlink receiving beam associated with the first beam indication information being the same as the downlink serving beam used by the terminal device, determining a working mode of the terminal device according to the signal strength of the downlink serving beam.

10. The method according to claim 9, wherein determining the working mode of the terminal device according to the signal strength of the downlink serving beam comprises at least one of the following:

in response to the signal strength of the downlink serving beam being greater than or equal to a first threshold, the terminal device entering a first mode;

in response to the signal strength of the downlink serving beam being greater than or equal to a second threshold, the terminal device entering the first mode;

determining a difference between the signal strength of the downlink serving beam and a signal strength of each downlink candidate beam corresponding to the terminal device, and in response to every difference being greater than or equal to a third threshold, the terminal device entering the first mode, wherein the third threshold is greater than a fourth threshold; and in response to every difference being greater than or equal to the fourth threshold, the terminal device entering the first mode.

11. The method according to claim 2, wherein the reference signal corresponding to the downlink candidate beam comprises a channel state information reference signal (CSI-RS) and/or a synchronization signal block (SSB) signal.

12. The method according to claim 1, wherein receiving the first information comprises:

receiving a DCI 1_1 signaling, wherein the first information is carried in the DCI 1_1 signaling.

13. An electronic device, comprising:

a memory having stored therein a computer program, and a processor connected to the memory, wherein in the case that the computer program is invoked by the processor, the processor is configured to perform a beam measurement method comprising:

receiving first information, wherein the first information comprises first beam indication information for indicating a downlink receiving beam; and in response to the downlink receiving beam associated with the first beam indication information being the same as a downlink serving beam used by a terminal device, determining a measurement manner of a reference signal of a beam according to a signal strength of the downlink serving beam; wherein determining the measurement manner of the reference signal of the beam according to the signal strength of the downlink serving beam comprises: in response to the signal strength of the downlink serving beam being greater than or equal to a second threshold, measuring the reference signal of the beam in a first mode, wherein the second threshold is a lower limit corresponding to a signal strength of the reference signal, wherein measuring the reference signal of the beam in the first mode comprises: measuring a reference signal of each downlink candidate beam according to a first time interval, wherein the first time interval is greater than a second time interval, and the second time interval is a time interval used in a case that a terminal device measures the reference signal of each downlink candidate beam based on a protocol agreement.

14. A non-transitory computer-readable storage medium having stored therein a computer program that, when executed by a processor, causes the processor to implement a beam measurement method comprising:

receiving first information, wherein the first information comprises first beam indication information for indicating a downlink receiving beam; and in response to the downlink receiving beam associated with the first beam indication information being the same as a downlink serving beam used by a terminal device, determining a measurement manner of a reference signal of a beam according to a signal strength of the downlink serving beam;

wherein determining the measurement manner of the reference signal of the beam according to the signal strength of the downlink serving beam comprises:

in response to the signal strength of the downlink serving beam being greater than or equal to a second threshold, measuring the reference signal of the beam in a first mode, wherein the second threshold is a lower limit corresponding to a signal strength of the reference signal, wherein measuring the reference signal of the beam in the first mode comprises:

measuring a reference signal of each downlink candidate beam according to a first time interval, wherein the first time interval is greater than a second time interval, and the second time interval is a time interval used in a case that a terminal device measures the reference signal of each downlink candidate beam based on a protocol agreement.

15. The electronic device according to claim 13, wherein the beam measurement method further comprises:

in response to the downlink receiving beam associated with the first beam indication information being different from the downlink serving beam used by the terminal device, measuring a reference signal of at least one downlink candidate beam corresponding to the terminal device.

16. The electronic device according to claim 13, wherein the first beam indication information comprises an index of a first TCI state associated with the downlink receiving beam.

17. The electronic device according to claim 16, wherein in response to the downlink receiving beam associated with the first beam indication information being the same as the downlink serving beam used by the terminal device, determining the measurement manner of the reference signal of the beam according to the signal strength of the downlink serving beam comprises any of the following:

in response to the first beam indication information being the same as second beam indication information associated with the downlink serving beam used by the terminal device, determining the measurement manner of the reference signal of the beam according to the signal strength of the downlink serving beam, wherein the second beam indication information comprises an index of a second TCI state associated with the downlink serving beam; and in response to a beam identifier of the downlink receiving beam associated with the first beam indication information being the same as a beam identifier of the downlink serving beam used by the terminal device, determining the measurement manner of the reference signal of the beam according to the signal strength of the downlink serving beam.

18. The electronic device according to claim 13, wherein the first beam indication information comprises a beam identifier of the downlink receiving beam; and in response to the downlink receiving beam associated with the first beam indication information being the same as the downlink serving beam used by the terminal device, determining the measurement manner of the reference signal of the beam according to the signal strength of the downlink serving beam comprises:

in response to the beam identifier of the downlink receiving beam being the same as a beam identifier of the downlink serving beam used by the terminal device, determining the measurement manner of the reference signal of the beam according to the signal strength of the downlink serving beam.

19. The electronic device according to claim 13, wherein determining the measurement manner of the reference signal of the beam according to the signal strength of the downlink serving beam further comprises at least one of the following:

in response to the signal strength of the downlink serving beam being greater than or equal to a first threshold, determining not to measure the reference signal of the beam;

determining a difference between the signal strength of the downlink serving beam and a signal strength of each downlink candidate beam corresponding to the terminal device, and in response to every difference being greater than or equal to a third threshold, determining not to measure the reference signal of the beam;

in response to every difference being greater than or equal to a fourth threshold, measuring the reference signal of the beam in the first mode, wherein the third threshold is greater than the fourth threshold;

in response to the signal strength of the downlink serving beam being less than the second threshold, measuring the reference signal of each downlink candidate beam; and in response to at least one difference being less than the fourth threshold, measuring the reference signal of each downlink candidate beam.

20. The electronic device according to claim 13, wherein the beam measurement method further comprises:

in response to the downlink receiving beam associated with the first beam indication information being the same as the downlink serving beam used by the terminal device, determining a working mode of the terminal device according to the signal strength of the downlink serving beam.

* * * * *